United States Patent Office 3,652,548
Patented Mar. 28, 1972

3,652,548
6-CARBONYLAMINO PENICILLANIC ACID DERIVATIVES OF SUBSTITUTED HYDROXYAMINO-ACETIC ACIDS, -ACETIC ACID ALKYL ESTERS AND -ACETANILIDES
Ronald J. McCaully, Malvern, and Stanley C. Bell, Penn Valley, Pa., assignors to American Home Products Corporation, New York, N.Y.
No Drawing. Filed Dec. 17, 1969, Ser. No. 886,019
Int. Cl. C07d 99/16
U.S. Cl. 260—239.1          6 Claims

ABSTRACT OF THE DISCLOSURE

This invention relates to novel 6-carbonylamino penicillanic acid derivatives of substituted hydroxyamino acetic acids, hydroxyamino acetic acid alkyl esters, and hydroxyaminoacetanilides.

phenylamine and hydroxy; $R_2$ is selected from the group consisting of (lower)alkanoyl, phenylcarbamoyl, mono and di-halophenylcarbamoyl, mono and di-(lower)alkylphenylcarbamoyl and mono and di-(lower)alkoxyphenylcarbamoyl; and pharmacologically acceptable acid addition salts thereof.

The novel penicillins which are the subject of this invention are prepared by reaction of the appropriately substituted hydroxyaminoacetic acids, hydroxyamino acetic acid alkyl ester, or hydroxyaminoacetanilide with 6-isocyanatopenicillanic acid, trimethyl silyl ester in an inert solvent, preferably anhydrous 1,2-dimethoxyethane in the presence of a catalytic amount of tertiary amine catalyst, preferably N-methylbenzimidazole at 10 to 60° C., preferably at 28° C., for 8 to 30 hours, preferably 16 hours. The solvent is removed in vacuo and the residue is triturated with ether and filtered. The trimethyl silyl ester is readily hydrolyzed by atmospheric moisture or by addition of moist acetone. The reaction may be represented schematically by the following.

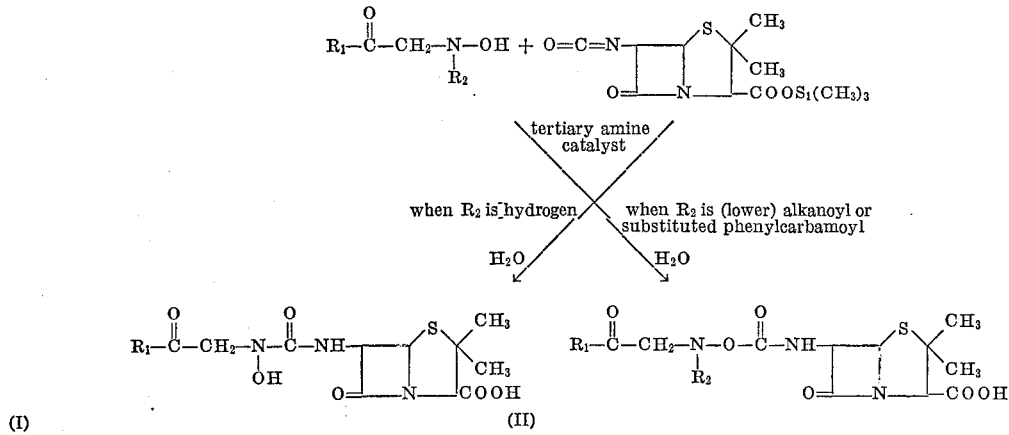

wherein $R_1$ and $R_2$ are the same as hereinabove defined.

Suitable pharmacologically acceptable salts of the compounds of the invention include the ammonium, sodium, potassium and various non-toxic amine salts such as triethylamine, procaine, dibenzylamine and other amines which are well known in the art as amine salts of benzylpenicillin.

The trimethylsilyl ester of 6-isocyanatopenicillanic acid which is used as a starting material may be prepared as follows:

The solution of 60 mmoles of 6-aminopenicillanic acid trimethylsilylester in 250 ml. of toluene is slowly added dropwise, in a nitrogen atmosphere, to a well stirred mixture of 132 mmoles of triethylamine, about 150 mmoles of phosgene and 90 ml. of toluene; the temperature of the reaction mixture is kept below —40° C. Stirring is continued for 3 hours; the reaction mixture is then filtered under nitrogen at —40° C. The temperature is slowly allowed to rise from —40° C. while the combined filtrates are evaporated under reduced pressure to a final volume of 70 ml. The solution contains about 0.71 mmole of the trimethylsilylester of 6-isocyanatopenicillanic acid, per ml. of solution.

DESCRIPTION OF THE INVENTION

The invention is concerned with compounds of Formulas I and II and with intermediates for their production.

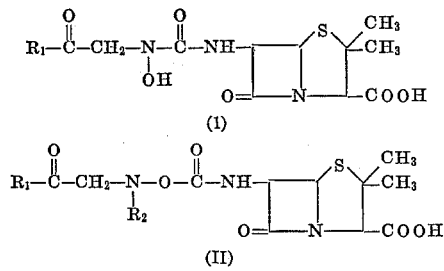

wherein $R_1$ is selected from the group consisting of (lower)alkoxy, mono and di-halophenylamine, mono and di-(lower)alkoxyphenylamine, mono and di(lower)alkyl- As used herein and in the appended claims, the term (lower)alkyl is meant to describe straight and branched chain hydrocarbon groups containing one to about six carbon atoms, which includes, methyl, ethyl, n-propyl, isopropyl, butyl, hexyl etc. The terms halo and halogen are used to describe chlorine, bromine, fluorine and iodine. By the term (lower)alkoxy is meant to include hydrocarbonoxy groups containing one to about six carbon atoms which include methoxy, ethoxy, propoxy, butoxy etc. The term (lower)alkanoyl is used to describe radicals derived by the removal of a hydroxy group from an aliphatic acid containing one to about six carbon atoms which include formyl, acetyl, propionyl, butyryl etc.

The compounds of the invention are useful antibacterial agents which may be employed in the treatment of bovine mastitis and for the treatment of various infections such as those which are amenable to therapy with benzylpenicillin. The compounds of the invention are also useful for the inhibition of *Staph. aureus*, Smith at a concentration of less than 75 micrograms/ml. when applied in an aqueous vehicle.

The compounds of the invention may be obtained in various hydrated forms as well as in the anhydrous state. It is the intent of this application to include all such forms.

The following examples are given by way of illustration and are not intended to limit the scope of the invention.

EXAMPLE I 6-(3-[p-chlorophenylcarbamoyl)methyl]-3-hydroxyureido)penicillanic acid, hemihydrate Separate solutions of 4.0 g. (20 mmole) of 4'-chloro-2-hydroxy aminoacetanilide in 90 ml. of dry 1,2-dimethoxy ethane and 6.28 g. (20 mmole) of 6-isocyanatopenicillanic acid, trimethylsilyl ester in 90 ml. of dry 1,2-dimethoxy ethane are added dropwise simultaneously in a nitrogen atmosphere to vigorously stirred 1,2-dimethoxy ethane (50 ml.). Upon addition the temperature of the solution increases from 24° C. to 27° C. The reaction mixture is stirred at 25° C. for 16 hours and the solvent is removed in vacuo. The residue is triturated with ether and the supernatant liquid is decanted. Trituration with ether is repeated two times and the solid is filtered and dried in a vacuum oven (260 mm. Hg.) at 40° C. to give 2.0 g. of product, M.P. 162–166° C. dec. The infrared spectrum (KBr) of the product exhibited bands at 5.64μ (β-lactam), 5.75μ broad (carboxyl), 6.03μ (amide I) and 6.58μ (amide II).

*Analysis.*—Calcd. for $C_{17}H_{19}ClN_4O_6S \cdot \frac{1}{2}H_2O$ (percent): C, 45.18; H, 4.46; N, 12.40; $H_2O$, 1.97. Found (percent): C, 45.69; H, 4.90; N, 12.18; $H_2O$, 1.54.

EXAMPLE II 2-carboxy-3,3-dimethyl-7-oxo-4-thia-1 - azabicyclo[3.2.0] heptane-6-carbamic acid, 6-ester with N - [(p - chlorophenylcarbamoyl)methyl]acetohydroxamic acid A solution of 2.2 g. (9.05 mmole) of 2-[hydroxy (acetyl)amino]-4'-chloroacetanilide and 2.85 g. (9.05 mole) of 6-isocyanatopenicillanic acid trimethyl silyl ester in 150 ml. of dry 1,2-dimethoxy ethane containing 100 mg. of N-methyl benzimidazole is stirred at 26° C. for 16 hours. After the solvent is removed on a rotary evaporator, the residue is triturated with ether, the supernatant liquid is decanted and the trituration-decantation process is repeated. The solid is filtered, washed with ether, and dried for three hours in a vacuum oven at 40° C. yielding 1.1 g. of product. The solid softens at 133° C. and decomposes at 148–152° C.

The infrared spectrum (KBr) of the product exhibited bands at 5.63μ (β-lactam), 5.73μ broad (carboxyl and carbamate), 5.94 (amide) and 6.56μ (amide II).

*Analysis.*—Calcd. for $C_{19}H_{21}ClN_4O_7S$ (percent): C, 47.06; H, 4.36; N, 11.55. Found (percent): C, 46.94; H, 4.60; N, 11.54.

EXAMPLE III 2-carboxy-3,3-dimethyl-7-oxo-4-thia-1 - azabicyclo[3.2.0] heptane-6-carbamic acid 6-ester with ethyl N-(p-chorophenylcarbamoyl)-N-hydroxyglycinate To a stirred solution of 100 mg. of N-methyl benzimidazole in 50 ml. of 1,2-dimethoxyethane at 26° C. is added simultaneously and at the same dropwise rate a solution of 5.0 g. of 5-(p-chlorophenyl)-3-hydroxyhydantoic acid, ethyl ester in 50 ml. of dimethoxyethane and a solution of 5.8 g. of 6-isocyanatopenicillanic acid, trimethylsilyl ester in 50 ml. of 1,2-dimethoxyethane. The reaction mixture is stirred for 16 hours at 26° C. Evaporation of the solvent on a rotary evaporator yields a residue which largely dissolves on addition of ether. The small insoluble residue is filtered (0.1 g.) and the ether filtrate is evaporated in vacuo to give 4.1 g. of product as a solid residue. M.P. 118–123° C. gas evoln,, coalesces as a clear melt at 144° C. The infrared spectrum (KBr) exhibited bands at 5.61μ (β-lactam), 5.73 (ester and acid carbonyl) 5.8–6.05μ broad shoulder bands (carbamate and amide I) and 6.54μ (amide II).

*Analysis.*—Calcd. for $C_{20}H_{33}ClN_4O_8S$ (percent): C, 46.65; H, 4.50; N, 10.88. Found (percent): C, 46.64; H, 4.96; N, 10.41.

EXAMPLE IV 2-carboxy-3,3-dimethyl-7-oxo - 4-thia-1-azabicyclo[3.2.0] heptane-6-carbamic acid, ester with N-(p-chlorophenylcarbamoyl)-N-hydroxyglycine, hydrate A solution of 4.9 g. (20.0 mmole) of 5-(p-chlorophenyl)-3-hydroxy hydantoic acid, 6.3 g. (20 mole) of 6-isocyanatopenicillanic acid, trimethyl silyl ester, and 100 mg. of N-methyl benzimidazole in 100 ml. of dry 1,2-dimethoxyethane is stirred at 27° C. for 16 hours. After filtration of the reaction solution, the solvent is evaporated on a rotary evaporator, and the residue is slurried with ether. The supernatant solution is decanted and the suspension-decantation process is repeated. Filtration yields 2.0 g. of product, which exhibited infrared spectrum (KBr) absorption bands at 5.65μ (β-lactam), 5.81μ (carboxyl and carbamate), 6.0μ (amide carbonyl) and 6.52μ (amide II).

*Analysis.*—Calcd. for $C_{18}H_{19}ClN_4O_8S \cdot H_2O$ (percent): C, 42.82; H, 4.19; N, 11.10. Found (percent): C, 42.80; H, 4.13; N, 11.43.

EXAMPLE V

The following compounds are prepared by procedures analogous to those employed in Example I using the appropriate substituted hydroxy aminoacetic acid derivative:

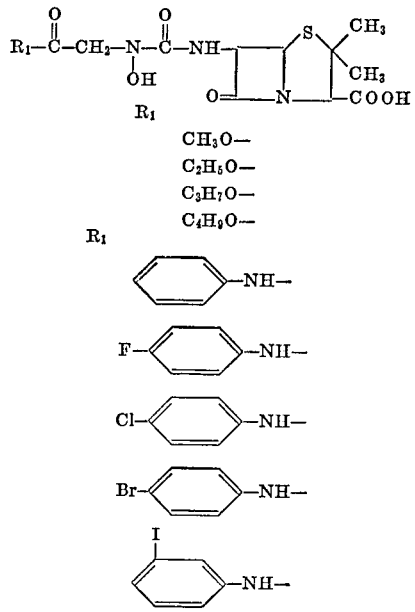

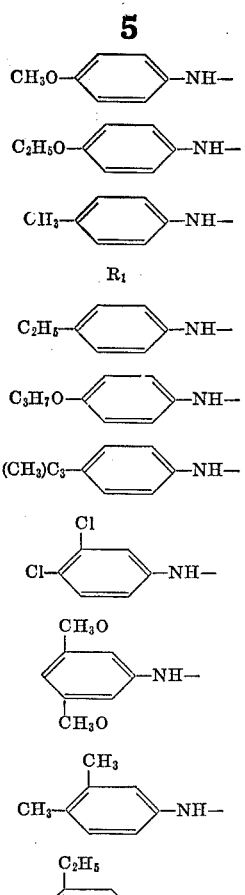
EXAMPLE VI
The following compounds are prepared by procedures analogous to those employed in Example II.
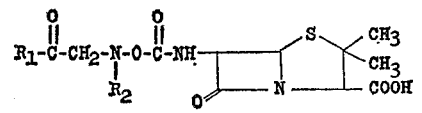
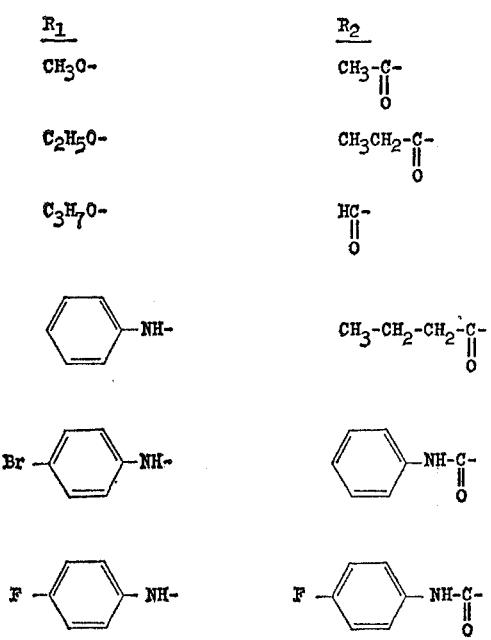
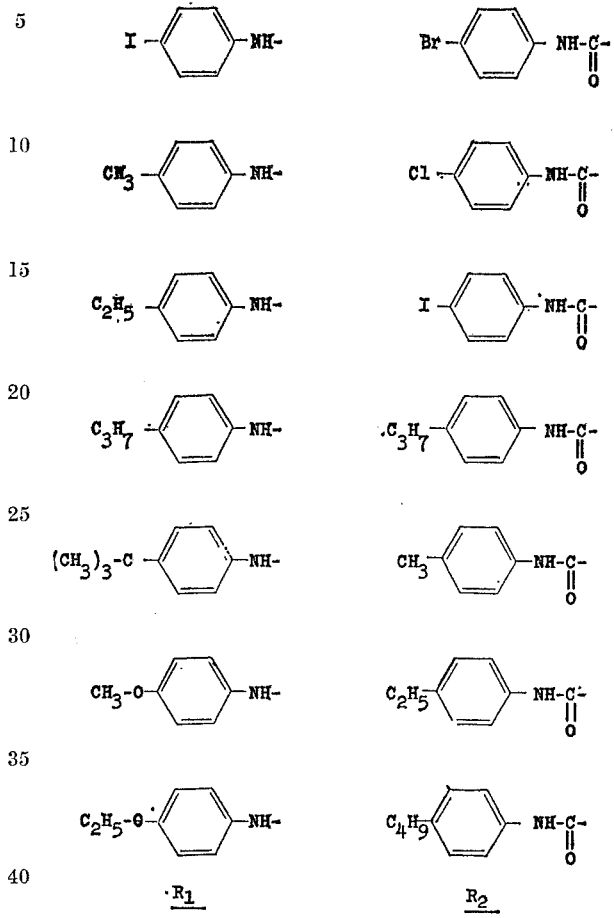
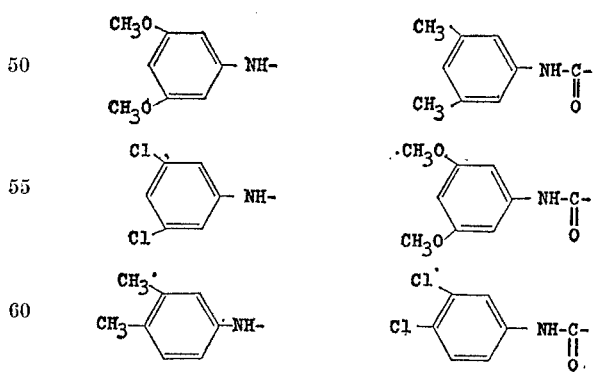
We claim:
1. A compound selected from the group consisting of those having the formulas:
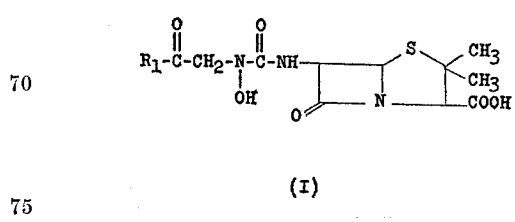
(I)

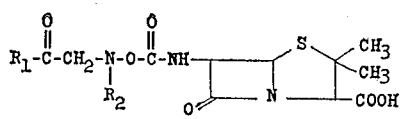

(II)

wherein $R_1$ is selected from the group consisting of (lower)alkoxy, mono and di-halophenylamine, mono and di-(lower)alkoxyphenylamine, mono and di(lower)alkylphenylamine and hydroxy; $R_2$ is selected from the group consisting of (lower)alkanoyl, phenylcarbamoyl, mono and di-halphenylcarbamoyl, mono and di(lower)alkylphenylcarbamoyl and mono and di-(lower)alkoxyphenylcarbamoyl; and pharmacologically acceptable acid addition salts thereof.

2. A compound as defined in claim 1 which is: 6-(3-[(p-chlorophenylcarbamoyl)methyl] - 3 - hydroxyureido)penicillanic acid, hemihydrate.

3. A compound as defined in claim 1 which is: 2-carboxy - 3,3 - dimethyl - 7 - oxo - 4 - thia - 1 - azabicyclo[3.2.0]heptane-6-carbamic acid, 6-ester with N-[(p-chlorophenylcarbamoyl)methyl]acetohydroxamic acid.

4. A compound as defined in claim 1 which is: 2-carboxy - 3,3 - dimethyl - 7 - oxo - 4 - thia - 1 - azabicyclo[3.2.0]heptane-6-carbamic acid, 6-ester with ethyl N-(p-chlorophenylcarbamoyl)-N-hydroxyglycinate.

5. A compound as defined in claim 1 which is 2-carboxy-3,3-dimethyl - 7 - oxo-4-thia-1-azabicyclo[3.2.0]heptane-6-carbamic acid, ester with N-(p-chlorophenylcarbamoyl)-N-hydroxyglycine, hydrate.

6. A compound of the formula:

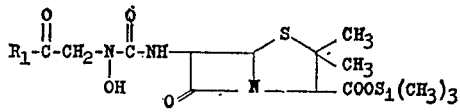

(I)

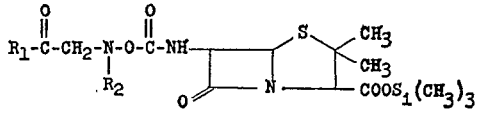

(II)

wherein $R_1$ is selected from the group consisting of (lower)alkoxy, mono and di-halophenylamine, mono and di-(lower)alkoxy phenylamine, mono and di(lower)alkylphenylamine and hydroxy; $R_2$ is selected from the group consisting of (lower)alkanoyl, phenylcarbamoyl, mono and di-halophenylcarbamoyl, mono and di-(lower)alkylphenylcarbamoyl and mono and di-(lower)alkoxyphenylcarbamoyl; and pharmacologically acceptable acid addition salts thereof.

References Cited
UNITED STATES PATENTS 3,120,512    2/1964    Wallhäusser et al. __ 260—239.1
3,180,863    4/1965    Naito et al. _____ 260—239.1

NICHOLAS S. RIZZO, Primary Examiner

U.S. Cl. X.R.

424—271